United States Patent Office 3,764,265
Patented Oct. 9, 1973

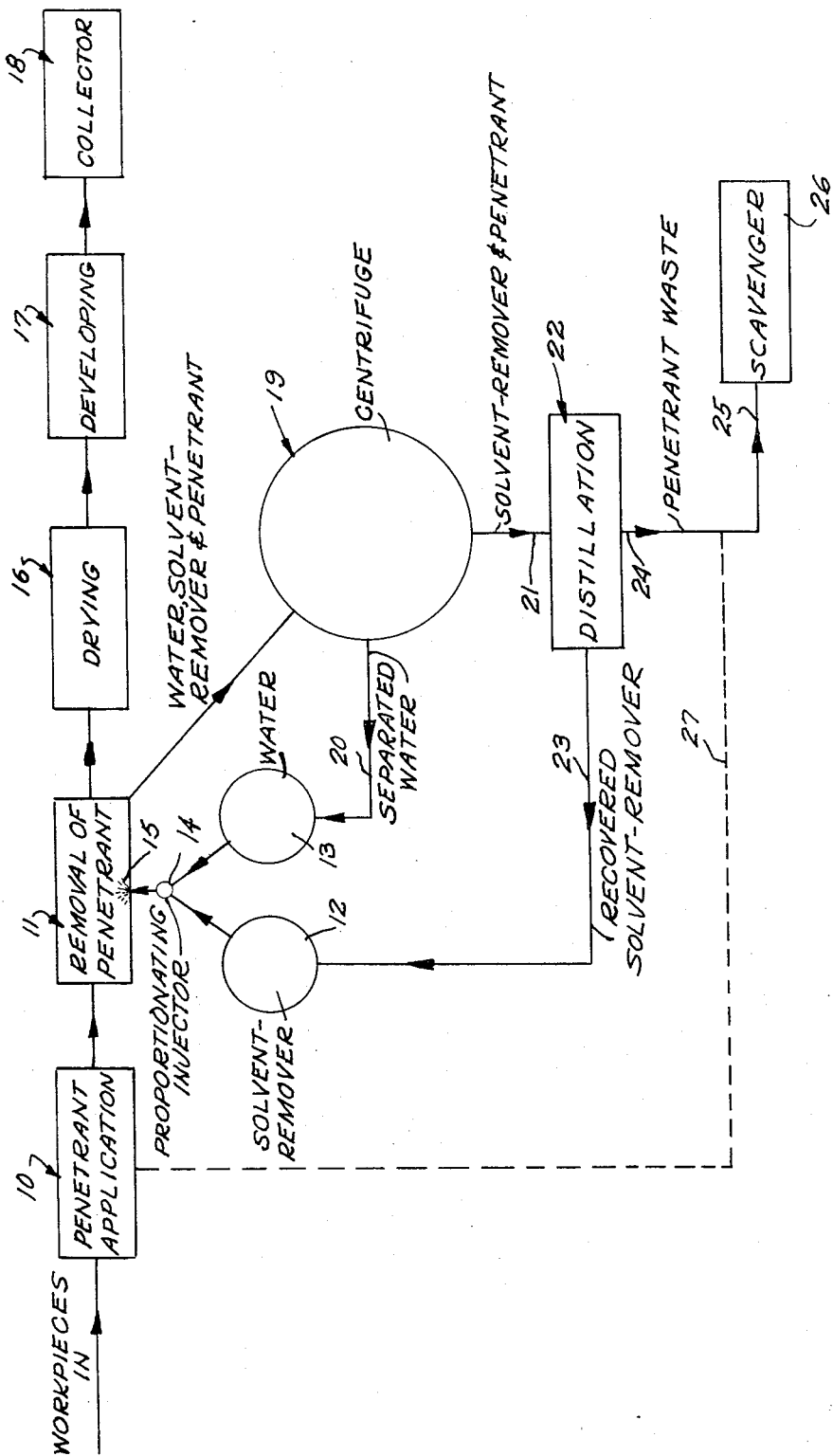

3,764,265
METHOD FOR THE REMOVAL OF PENETRANTS IN A CLOSED SYSTEM
Adolf Mlot-Fijalkowski, 2028 N. 77th Ave., Elmwood Park, Ill. 60635
Continuation-in-part of application Ser. No. 800,097, Feb. 18, 1969, now Patent No. 3,607,784. This application Sept. 20, 1971, Ser. No. 181,938
Int. Cl. G01n 19/08, 21/04
U.S. Cl. 23—230 R                3 Claims

ABSTRACT OF THE DISCLOSURE

A closed system wherein a colored liquid penetrant such as is used for the penetrant inspection of a workpiece surface for flaws, after being applied to the surface of the workpiece is removed therefrom by spraying thereagainst a liquid mixture of water and a solvent-remover for the penetrant, the resulting admixture is centrifuged to effect the separation of a mixture of solvent-remover, water and penetrant, the separated water returned for re-use and the solvent-penetrant mix is subjected to distillation to recover the solvent-remover for re-use in the system, and also optionally the recovery of the penetrant.

RELATED APPLICATIONS

This application is a continuation-in-part of my application Ser. No. 800,097, filed Feb. 18, 1969, to be issued into Pat. No. 3,607,784, dated Sept. 21, 1971.

SUMMARY OF THE INVENTION

This invention more particularly relates to an improvement in the penetrant method disclosed and claimed in my above referred to application for patent. The method disclosed in that application includes the application to the surface of a workpiece of a liquid, oily-type of penetrant to cause the penetrant to be entrapped in any surface discontinuities, with the subsequent demoval of any film of excess penetrant from such surface without removing entrapped penetrant. The improvement therein disclosed and claimed includes applying to the penetrant-filmed surface a two-phase liquid remover free from any emulsifier and consisting essentially of water as the continuous phase and a water-immiscible liquid suspended therein in finely divided form as the dispersed phase, the dispersed phase constituting as a minimum about 0.2% of said two-phase liquid remover by weight, the liquid of said dispersed phase being miscible with and a solvent for the liquid vehicle of said penetrant and the application of said liquid remover being sufficiently vigorous to cause said liquid remove to effect the dispersement and removal of said penetrant film from said surface.

The present application is directed to an improvement whereby a closed system of penetrant removal is made possible. As in the above-identified application, the liquid penetrant is applied to the surface of the workpiece and the excess of penetrant thereafter removed. In accordance with the present invention, the removal is effected by forcefully spraying against the surface of the workpiece a mixture of a solvent for the penetrant, which is termed a "solvent-remover," and water, the solvent remover and water being properly proportioned by a proportionating injector so as to facilitate the removal of excess penetrant by spraying only. As a result of the spraying step, a mixture of water, solvent-remover and penetrant is collected that is charged into a suitable centrifuge, wherein water is separated for re-use as a supplement to the water used in the proportioning injector, and a solvent-penetrant mix is also separated in the centrifuging step and conveyed into distillation apparatus. In such apparatus, the solvent-remover is separated by distillation and re-used as the solvent-remover, or as a supplement to the solvent-remover in the proportionating step. As a result of the distillation step, a distillate termed "penetrant waste" is discharged separately and may be sent to a scavenger for disposal without disturbing the environmental ecology of the place where the system is being operated.

While the penetrant waste is a relatively small fractional percentage by volume of the total volume of effluent comprising penetrant, solvent-remover and water, if the penetrant waste were discharged into a body of water, particularly a quiescent body, the resulting oil film that would form over the water would shut off oxygen to fish and other creatures living in the water. Additionally, if the penetrant contains a fluorescent dye, as is quite customary in colored penetrant inspection methods, the fluorescence imparted to the surface of the water would give an appearance of pollution way out of proportion to the amount of waste penetrant in the body of water receiving it. Since the waste penetrant is so relatively insignificant in volume. it is relatively inexpensive to arrange for a scavenger to pick it up and dispose of it where it will not affect the environmental ecology.

The term "workpiece" as used herein is employed to designate any article or structure to be inspected by the penetrant method, and the expression "oily type" refers to penetrants having a liquid vehicle that is immiscible with water and that is neither self-emulsifying nor contains an added emulsifier to render it water washable. Usually, the penetrant contains a visible or fluorescent dye to give a color indication at the locus of any surface discontinuity that is rendered visible upon inspection under white or black lights. The solvent-remover that is used in the practice of my invention is a solvent for the liquid vehicle of the penetrant, and also usually a solvent for the dye used in the penetrant. Suitable solvent-removers include aliphatic, aromatic and chlorinated hydrocarbon solvents, but in general, aromatic solvents have been found to be inferior to aliphatic hydrocarbons and particularly chlorinated aliphatic hydrocarbon solvents.

The following is a list of suitable solvent-removers:

Remover A and B.—Extremely pure aliphatic solvents, characterized by the following:

Sulfur and chloride contents: 10 p.p.m. and 1.0 p.p.m., respectively
Boiling or distillation temperatures: 360° F.
Flash point (TCC) 120° and 125° F., respectively Remover C.—aliphatic solvent having characteristically the following:

Sulfur and chloride contents: less than 100 p.p.m.
Boiling or distillation temperature: 375° F.
Flash point (TCC) 141° F.

Remover D.—Aliphatic solvent characteristically having the following:

Sulfur and chloride content: less than 100 p.p.m.
Distillation temperature: 450° F.
Flash point (TCC): 175° F.

Remover E.—A chlorinated solvent:

Distillation temperature: 250° F.
Flash point (TCC):

Remover F.—A chlorinated solvent:

Distillation temperature: 186° F.
Flash point: None

The separation of a solvent-removed from a penetrant is effected by distillation, such as that shown in the diagrammatic flow sheet of the drawing.

The penetrant, which includes the liquid vehicle and the dye, if used, may be any of those disclosed in Pat.

No. 2,806,959, in which water-immiscible organic liquid solvents such as kerosene and naphtha, and the like are specifically mentioned; and also penetrants such as disclosed in Pat. No. 3,546,130, wherein volatile and/or non-volatile solvents are used for the dye of the penetrant and a common solvent employed is preferably one that is non-flammable, such as the chlorinated hydrocarbon solvents, to wit; trichloroethylene, perchloroethylene, 1,1,1-trichloroethane, ethylene dichloride, or mixtures thereof.

Exprimental work carried out in connection with the method of my invention has indicated that the specific gravity of the materials that become mixed together does not interfere with the separations effected by centrifuging. For example:

Specific gravity of water _____ 1.000
Specific gravity of perchloroethylene _____ 1.618
Specific gravity of penetrant (ZL–2A) _____ 0.9572

Upon centrifugation of a mixture of the above components a mixture of perchloroethylene and the penetrant comes off as separate from the water. This is regardless of the difference in specific gravities of perchloroethylene and the penetrant; the mutual compatibility is the property which always effects the combination of the water-immiscible penetrant with the water-immiscible solvent, in this case perchloroethylene. The water-immiscible solvent in the penetrant ZL–2A is a mixture of aliphatic and aromatic hydrocarbon solvents. These are miscible with the perchloroethylene used as the solvent-remover, and consequently in the separation affected by centrifuging, the perchloroethylene and the penetrant, ZL–2A, come off together, while the water comes off separately. This is due to the difference in specific gravity of water and that of the mixture of penetrant liquid vehicle and solvent-remover in admixture.

The separated water is recovered for re-use in supplementing the water that is mixed with the solvent-remover by means of the proportion injector.

The combined remover-solvent and penetrant, separated by centrifugal action, is subjected to distillation for the recovery of the solvent-remover and is re-used in supplementing the solvent-remover that is mixed in the proportioning injector with water.

These separations and re-uses leave only the penetrant waste for disposal, and, as stated above, such penetrant waste is such a minor fraction of the total effluent as to present no serious problem from the standpoint of maintaining the environmental ecology.

It is therefore an important object of my invention to provide a closed system for the removal of penetrant and the re-use of the major components involved in the inspection of workpieces for surface discontinuities by the so-called liquid penetrant method, whereby heretofore pollution of the environmental ecology is minimized or even eliminated.

Other and further important advantages and benefits of my invention will become apparent from the following description and appended claims.

BRIEF DESCRIPTION OF THE DRAWINGS

The drawing constitutes a schematic diagram of the closed system for the removal of penetrant embodying the principles of my invention.

DETAILED DESCRIPTION OF THE INVENTION

In the drawings, the reference numeral 10 indicates the penetrate application stage wherein the workpieces are treated by applying to the surfaces thereof, as by spraying, dipping, foaming or brushing on, a suitable colored liquid penetrant. The penetrant is of the oily type in which the liquid vehicle is a water-immiscible aliphatic or aromatic hydrocarbon or chlorinated hydrocarbon, and has dissolved therein either a visible or a fluorescent dye, as in the patents mentioned hereinabove.

From the stage 10, the workpieces to which the penetrant has been applied in the stage 10 are transferred to stage 11, wherein removal of the excess of penetrant remaining on the surfaces of the workpieces is carried out. Such removal of the excess penetrant is accomplished by spraying against the workpieces a forceful stream or streams of a solvent-remover from a source of supply 12, and water from a water source 13, intermixed in proper proportions by means of a proportionating injector 14 and discharged in the form of a spray, indicated at 15, at stage 11. Spraying only is employed in removing the excess of penetrant from the surfaces of the workpieces, using sufficient force to effect substantially complete removal of the excess of penetrant without, however, removing any appreciable amount of entrapped penetrant in such flaws or surface discontinuities as may be present. Suitable spraying is accomplished by airless or hydrosprays, using either cold or warm water.

From stage 11, the workpieces may be sent through conventional stages of drying, indicated by the reference numeral 16, through a developing stage 17 and thence to a collecting stage 18.

In accordance with my present invention, water, solvent and penetrant are recovered in admixture from stage 11 and transferred into a suitable centrifuge 19.

From the centrifuge 19, the separated water is conveyed through a line 20 to the water supply 13 for re-use in the system to supplement any water freshly introduced thereinto.

Also, from the centrifuge 19, a mixture of solvent-remover and penetrant is conveyed to a line 21 into distillation apparatus 22. In the distillation apparatus, distillation is carried out under such conditions as to separate a distillate of recovered solvent-remover which is carried off through a line 23 to the solvent-remover supply 12. Additionally, penetrant waste is drawn off from the distillation apparatus through a line 24 and thence to a line 25 to a scavenger collector stage 26. Alternatively, under certain conditions the penetrant can be recovered and conducted back through a line 27, indicated by a dash-dash line on the drawing.

Depending on such variable as viscosity of the penetrant, dwell time during application of the penetrant to the workpiece, the surface geometry and finish of the workpices, the approximate composition of the effluent of water, solvent-remover and penetrant transferred from the removal of penetrant stage 11 to the centrifuge 19 is:

|  | Percent |
|---|---|
| Penetrant | 0.1 to 0.5 |
| Solvent-remover | 0.1 to 3.0 |
| Water | 99.8 to 96.5 |

The centrifuge is preferably operated as a continuous and efficient means for separating the solvent-remover and penetrant from the effluent going to the centrifuge. Water, being the predominant phase, will separate in slightly contaminated condition if a lighter-than-water solvent-remover is employed. On the other hand, if the solvent-remover and penetrant mixture is heavier than water, such mixture will carry some water as a contaminant during the separation.

So long as the distillation in the distillation equipment 22 is carried out as a continuous method, the distillate will include some solvent-remover along with the penetrant, and hence the penetrant cannot be recovered for re-use simply by distillation. However, if the centrifuge is operated as a batch process operation, the solvent-remover and the penetrant can usually be separated sufficiently by distillation alone to enable the penetrant to be separately recovered for re-use.

Even if it is not feasible to recover the penetrant as such, and to re-use it, the percentage of penetrant waste collected for the scavenger at state 26 is so relatively small as to be almost inconsequential. If, for instance, the penetrant amounted to only 0.1% by volume of the effluent from the penetrant removal stage 11, that would mean on a ten thousand gallon per day flow of effluent, only 10 gallons of penetrant waste. It would thus be a simple matter to get rid of the penetrant waste to a scavenger, as already mentioned.

In view of the comparatively small volume of solvent-remover and penetrant that is discharged from the centrifuge, the capacity of the distillation equipment need not be nearly as high as that of the centrifuge. In view of the fact that the temperature at which the distillation is carried out is close to that of the boiling point of water, any apparaus which is satisfactory for the distillation of water can be employed as the distilling equipment 22.

In view of the distillation requirements in order to effect the separation of the solvent-remover from the penetrant waste, chlorinated hydrocarbon solvents and regular kerosenes having a distillation range not exceeding 200° F., have been found suitable. Additionally, however, a solvent termed "Isopar K," which is an "odorless" solvent with balanced volatility characteristics, and a flash point (TCC) of 120° F., can be satisfactorily employed. This product is produced by synthesis from selected petroleum-derived raw materials and is composed almost entirely of isoparaffinic hydrocarbons with highly branched molecular structures. Another satisfactory solvent in the same series, designated as "Isopar H," can be employed. This solvent has a flash point (TCC) of about 125° F. and is a carefully fractionated isoparaffinic hydrocarbon of exceptional purity, composed largely of saturated paraffins of highly branched molecular structures.

For further details of the operations carried out at stages 10 and 11 of the accompanying schematic diagram, reference is made to the previously mentioned Pats. Nos. 2,806,959 and 3,546,127, and more particularly to Pat. No. 3,607,784. The data as to hydrocarbons and chlorinated hydrocarbons appearing on page 9 of the application, Ser. No. 800,097 that resulted in said Pat. No. 3,607,784 are specifically incorporated herein by reference to supplement the information given hereinabove with regard to the hydrocarbon and chlorinated hydrocarbon solvents that are suitable for use as the "solvent-remover" used in my present invention.

It will be understood that modifications and variations may be effected without departing from the scope of the novel concepts of the present invention.

I claim as my invention:

1. In a method for the colored liquid penetrant inspection of a workpiece surface for flaws wherein said penetrant includes a water-immiscible liquid vehicle as the dye solvent and is applied to said surface to leave a film of excess penetrant thereon that is removed by applying to said film a liquid mixture of water and a substantially water-insoluble solvent-remover for said penetrant, the improvement which comprises the steps of centrifuging the resulting admixture of said liquid mixture of water and solvent-remover with said removed excess penetrant, separating water as a result of said centrifuging step for re-use in said liquid mixture, separating a solvent-remover-penetrant mix from said resulting admixture as a result of said centrifuging step, distilling said mix to separate solvent-remover from said penetrant, and re-using said solvent-remover in said method.

2. A method as defined by claim 1, wherein said liquid mixture of water and a solvent-remover for said penetrant is formed by proportionally injecting streams of said water and solvent-remover respectively into a common stream prior to applying the resulting liquid mixture of water and solvent-remover against said film of excess penetrant.

3. A method as defined by claim 1, wherein, said solvent-remover is a solvent for the water-immiscible liquid vehicle constituting the penetrant and forms therewith a single liquid phase solution separable from the water associated therewith as a result of said centrifuging step.

References Cited
UNITED STATES PATENTS

| | | | |
|---|---|---|---|
| 1,770,736 | 7/1930 | Funk | 210—78 |
| 2,806,959 | 9/1957 | De Forest et al. | 73—104 X |
| 2,839,918 | 6/1958 | Switzer | 73—104 |

OTHER REFERENCES

Technical Data Bull., Shannon Luminous Mat. Co., "Penetrant Parameters," 1965, pp. 1–5.

Technical Data Bull., Shannon Luminous Mat. Co. "Penetrant Maintenance," 1965, p. 5.

MORRIS O. WOLK, Primary Examiner

R. E. SERWIN, Assistant Examiner

U.S. Cl. X.R.

23—253 R; 73—104; 134—10; 210—78